7096X
J. L. Mott,
Stoves,
Patented May 30, 1832.
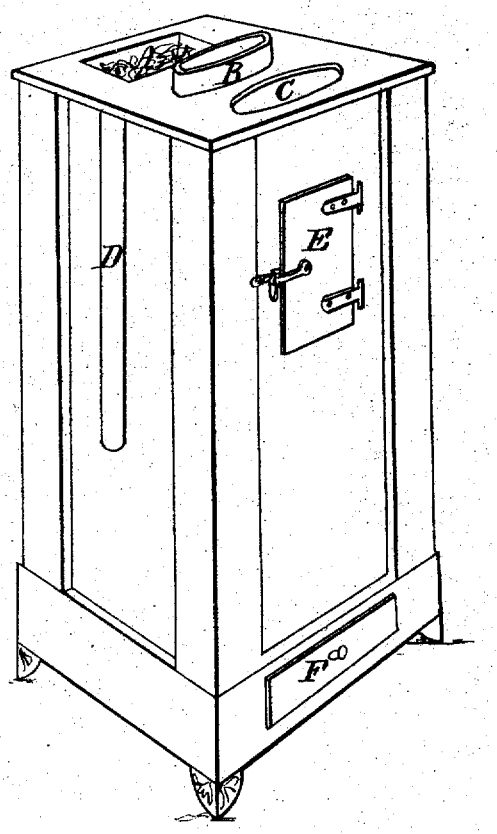
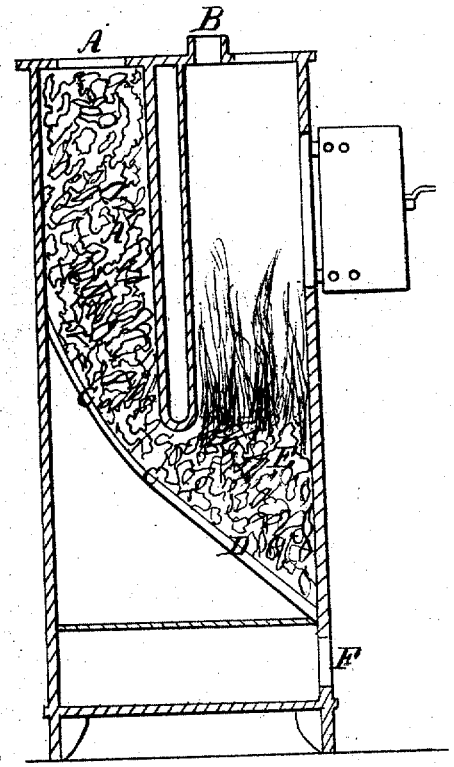

7096x

May 30. 1892

Jordan L. Mott . New York City

Letters Patent

The Schedule referred to in these Letters Patent and making part of
the same containing a description in the words of the said Jordan L. Mott
himself of his improvement in Stoves for Burning Anthracite Coal To all to whom these presents shall come. Be it known that I Jordan L. Mott of the ~~County~~ City and State of New York have invented constructed
and applied to use a new and useful improvement in Stoves used for burning
Anthracite Coal. Said improvement is not confined to any particular form or dimension of Stoves but is applicable to many of the Coal Stoves now in use.
It consists in dividing the interior of that part of the Stove intended for fuel into
two compartments by means of a partition so as to form on one side a reservoir to
contain a supply of coal. in the other side the fire and draught and a plain or
curved plate inclined with an opening between the lower edge of the partition &
the plate to admit the coal to slide forward from the reservoir on to the grate placed
at the bottom of the fire or front division as follows. Near the bottom of
the Stove on the side intended for the fire place a plain or curved grate
inclined from the front of the stove upwards leaving sufficient room under
it for draught and to have a pan or drawer to receive the ashes. The grate
to extend from the side of the Stove to nearly under a line with the lower
edge of the partition. At the bottom of the reservoir or coal division place
the curved or plain plate inclined with the lower edge against or above the edge
of the grate. its upper edge against the side of the Stove. The partition
to commence at the top of the Stove or sufficiently near the top to give depth
in the reservoir for a supply of coal and run down towards the lower edge of
the curved or plain plate leaving a space between the lower edge of the partition
and the curved or plain plate of say six inches (more or less) or in proportion
to the depth of coal required to be burnt on the grate. If the coal be in small
lumps make the distance less and increase the distance according to the
size of the coal. The partition may be made double by placing two plates apart and parallel or nearly so to each other to join near their lower edge with apertures through the sides of the Stove to admit a free circulation of air between the plates. The plain or curved plate and grate to be incline[d] sufficiently to admit the coal to slide freely from the reservoir ~~[illegible]~~ to the lower edge of the grate to the front of the Stove. The curved and plain plate & grate may be in one piece or otherwise. The partition may have a flat or curved surface. The partition and the plain or curved plate may be made of fire brick, Soap Stone, metal or any suitable material. The Stove may be equally divided or otherwise as required. The reservoir may be a little larger at the bottom than the top to admit the coal to settle more freely. On the top or on the side near the top of the reservoir have an aperture or hole of suitable dimensions for filling it with coal with a door or lid to prevent the air passing through the reservoir. On the side of the Stove over the grate near the surface of the fire or coal place a door for the ~~[illegible]~~ making fire. On the top or on the side near to the top of the fire division place the pipe flue or hole. If the partition or coal division is not carried to the top of the Stove the draught may be carried over the top of the reservoir from the fire division by placing the pipe flue or hole on the back of the Stove over the top of the reservoir. Have a door or opening under the curved or plain plate to admit the ashes being freed.

Manner of use: - Kindle a fire on the grate, when the coal gets burning fill the reservoir with Coal, and as the coal on the grate is consumed and the ash is freed, that in the reservoir by means of its gravity and the inclined plane or curved plate and grate is brought forward on the grate and to the front of the Stove thereby keeping up a regular supply.

That which I claim as my invention and improvement is the dividing of the Stove the inclined plane or curved plate and the inclined grate as above specified for the above mentioned purposes. In witness whereof I have hereunto subscribe my name this twenty third day of April 1832

En. Witnesses
MK Stephen B. Denison Jordan L. Mott
James [illegible] Mills

May 30.1832) (835 [illegible]